United States Patent
Weiske et al.

(10) Patent No.: US 7,020,092 B1
(45) Date of Patent: Mar. 28, 2006

(54) METHOD FOR CHANNEL ADJUSTMENT OF TRANSMISSION SIGNAL POWER IN A WAVELENGTH DIVISION MULTIPLEXING TRANSMISSION SYSTEM

(75) Inventors: Claus-Jörg Weiske, Fürstenfeldbruck (DE); Peter Krummrich, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/807,766

(22) PCT Filed: Oct. 1, 1999

(86) PCT No.: PCT/DE99/03178

§ 371 (c)(1),
(2), (4) Date: Apr. 18, 2001

(87) PCT Pub. No.: WO00/25465

PCT Pub. Date: May 4, 2000

(30) Foreign Application Priority Data

Oct. 23, 1998 (DE) ................................ 198 48 989

(51) Int. Cl.
*G08C 15/00* (2006.01)

(52) U.S. Cl. ................. 370/252; 398/14; 398/25; 398/26; 398/34; 398/38; 398/94; 398/171

(58) Field of Classification Search ............... 370/252; 398/79, 14, 25, 26, 34, 38, 94, 171; 359/337.13, 359/337.5
See application file for complete search history.

(56) References Cited

U.S. PATENT DOCUMENTS

| | | | | |
|---|---|---|---|---|
| 5,276,543 A | * | 1/1994 | Olshansky | ............... 398/79 |
| 5,500,756 A | * | 3/1996 | Tsushima et al. | ........... 398/181 |
| 5,790,289 A | | 8/1998 | Taga et al. | |
| 5,815,299 A | | 9/1998 | Bayart et al. | |

FOREIGN PATENT DOCUMENTS

| | | |
|---|---|---|
| DE | 195 38 753 | 4/1997 |
| DE | 196 21 566 | 12/1997 |
| EP | 0 734 129 | 9/1996 |
| EP | 0 865 173 | 9/1998 |

OTHER PUBLICATIONS

A.R. Chraplyvy, et al., IEEE Photonics Technology Letters, vol. 4, No. 8, Aug. 1992 Equalization in Amplified WDM Lightwave Transmission Systems; pp. 920-922.

* cited by examiner

Primary Examiner—Wellington Chin
Assistant Examiner—Kevin Mew
(74) Attorney, Agent, or Firm—Bell, Boyd & Lloyd LLC

(57) ABSTRACT

For exact level balancing or signal-to-noise ratio balancing of received signals in a wave-length-division multiplex transmission system, the associated transmitted signal power levels are adjusted. If the maximum permissible dynamic range is exceeded, the individual transmitted signal power levels are compressed, while the total transmitted signal power level is kept at least approximately constant.

7 Claims, 5 Drawing Sheets

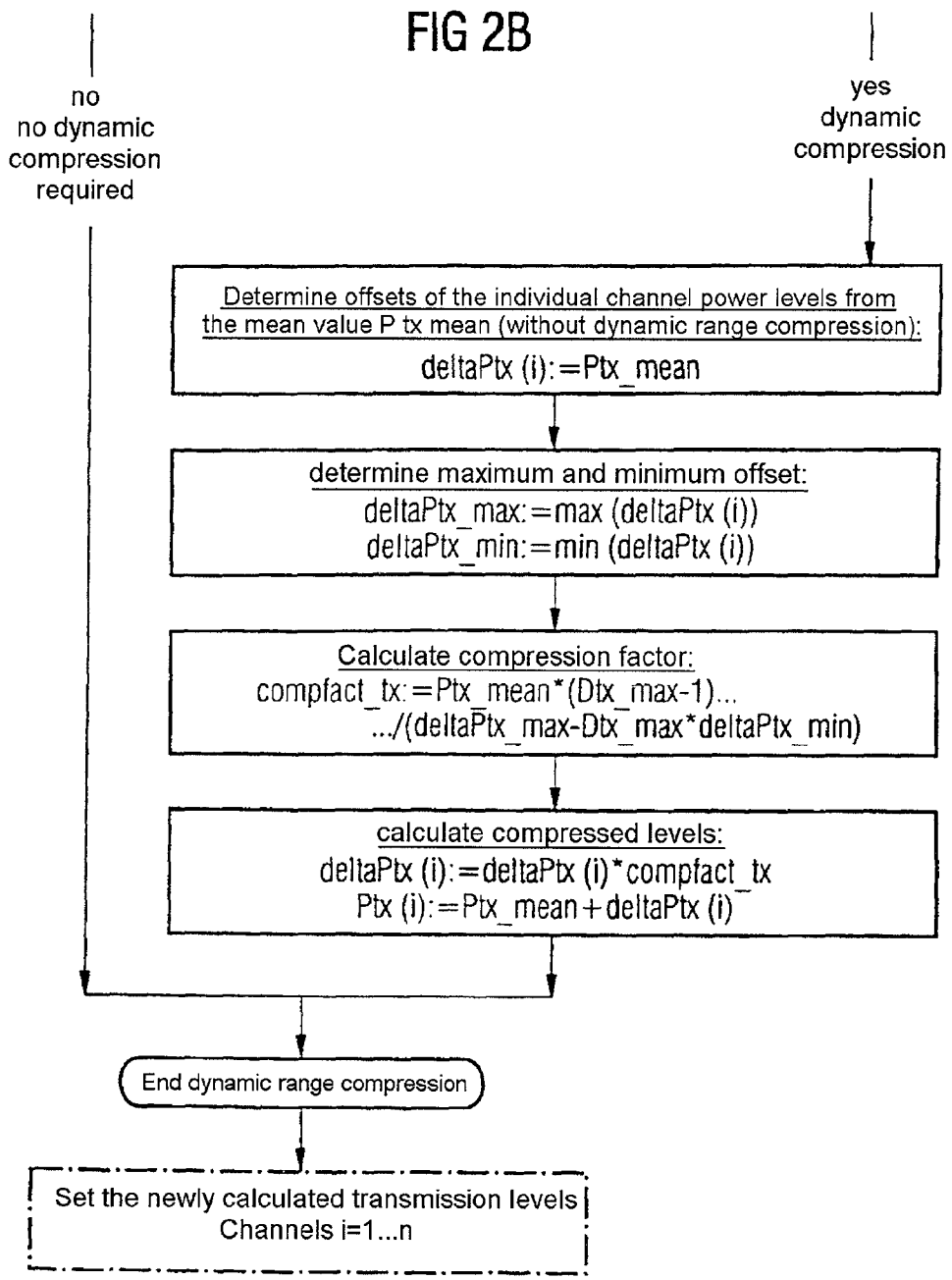

METHOD FOR CHANNEL ADJUSTMENT OF TRANSMISSION SIGNAL POWER IN A WAVELENGTH DIVISION MULTIPLEXING TRANSMISSION SYSTEM

BACKGROUND OF THE INVENTION

1. Field of the Invention

The present invention pertains to optical wavelength division multiplex transmission systems in general. Specifically, the present invention pertains to adjustment of transmitted signal power levels in optical wavelength division multiplex transmission systems.

2. Discussion of the Related Art

Owing to the wavelength dependency of optical amplifiers, optical wavelength-division multiplex transmission systems have losses in the transmission fibers and in passive optical components as well as attenuation levels which differ due to non-linear effects such as signal coupling resulting from stimulated Raman scatter in general for the various signals and channels. In an optical transmission path which comprises a number of path sections having a number of fiber amplifiers, these effects can become additive. As a consequence of this, at the receiving end, the weaker optical signals are no longer detected without faults by the optical receiver since their levels are too low or since their optical signal-to-noise ratio (OSNR) is too low. On the other hand, the maximum permissible input level of the optical receiver may be exceeded by a signal which is attenuated to a lesser extent.

One method, which is used in existing optical transmission systems, for compensating for the different levels or OSNR values is corresponding initial compensation at the transmission end, which is referred to as preemphasis. In this case the level or OSNR distribution of the channels/signals at the reception end is measured using an optical spectrum analyzer, and the level at the transmission end is raised for signals which arrive with severe attenuation at the receiver, while the level of more powerful signals is correspondingly reduced, to ensure that all the received signals have the same power level, also referred to as level balance, or the same optical signal-to-noise ratio (OSNR balance) at the reception end. The raising or lowering of the transmitted signal level for each channel or for each transmitted signal is generally selected such that the total transmitted signal power level, that is the total of the power levels of all the transmitted signals and of the total signal, remains unchanged at the start of the optical path or does not exceed a maximum value.

Suitable algorithms for level and OSNR balancing are described in the article "Equalization in Amplified WDM Lightwave Transmission Systems" appearing in IEEE Photonics, Technology Letters, Vol. 4, No. 8, August 1992, pages 920 to 922.

However, disadvantages can occur if exactly implemented level or OSNR compensation is used. One such disadvantages is that, owing to the wavelength dependency of the path loss, complete level balancing for the reception end can lead to an excessively high level dynamic range at the transmitting end. Hence, an excessively large quotient between the maximum and minimum channel power level can occur. There is then a risk of signals with a raised transmitted power level being distorted by non-linear effects in the fibers and/or of transmitted signals with a greatly reduced level actually falling below the minimum input power level of an optical amplifier, which would result in considerable signal distortion due to noise.

Complete OSNR balancing for the reception end can also lead to an excessive level dynamic range at the transmitting end. In addition, there is a risk of the maximum permissible input level range of one or more of the connected optical receivers being exceeded or undershot.

A method and arrangement for adjusting identical signal levels is shown in U.S. Pat. No. 5,815,299. In the method, the average level of all the transmitted signals and the level of the weakest signal are determined. The other signals are attenuated as a function of the difference between the average level and the level of the weakest signal. However, this reduces the average level and thus the quality of all the other channels. Such a method admittedly leads to identical levels in all the channels, but does not optimally utilize the maximum possible dynamic range and thus does not achieve optimum transmission quality or optimum range.

In general, exact level balancing at the reception end is not required, since the connected optical receivers have a considerable level dynamic range in which they operate optimally. In the same way, exact OSNR balancing is not required, provided appropriate system margins are available. In this case, a method which considers only the dynamic range of the transmitted signals would be optimal. Since, systems of this type operate at an optimum or maximum permissible total power level, it is advantageous for this level to remain constant in any compression of individual transmitted signal power levels which may be required.

For OSNR balancing however, the maximum permissible dynamic range at the reception end must also be checked, and if necessary, the received signal power levels are adapted by compression. This is done by changing the power level of the individual transmitted signals, and compliance with the transmission-end dynamic to range must be checked once again and, if necessary, changed.

SUMMARY OF THE INVENTION

It is an object of the present invention to provide a method for channel-by-channel adjustment of transmitted signal power levels in which the transmission-end dynamic range is complied with without unnecessarily adversely affecting the transmission quality.

It is another object of the invention to provide a method for channel-by-channel adjustment of transmitted signal power levels in which reception-end dynamic range for exact OSNR balancing is achieved.

These and other objects of the invention will become apparent from careful review of the following detailed description of the preferred embodiments, which is to be read in conjunction with a review of the accompanying drawing figures.

DETAILED DESCRIPTION OF THE PREFERRED EMBODIMENTS

Figure 1:
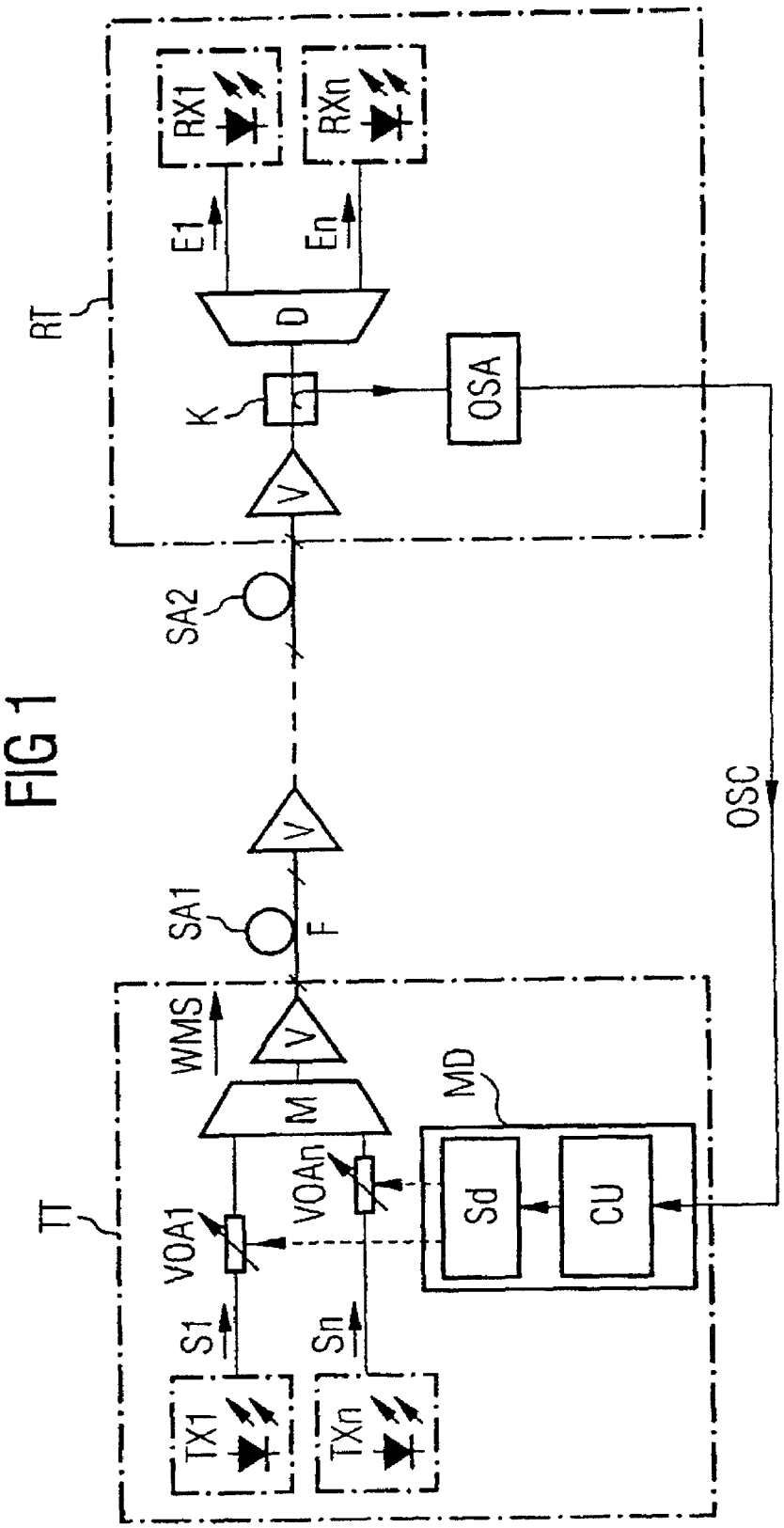
FIG. 1 shows an exemplary wavelength division multiplex transmission system with dynamic range compression.

FIG. 1 shows a circuit diagram of a wavelength division multiplex (WDM) transmission device.

A transmission terminal TT is provided which contains a number of optical transmitters TX1–TXn for transmitting data via channels allocated to different wavelengths. Corresponding transmitted signals S1–Sn are passed via adjustable optical attenuators VOA1 to VOAn, and are combined by a multiplexer M to form a wavelength-division multiplex signal WMS. The signal WMS is fed into an optical fiber F and transmitted via various path sections SA1, SA2 to a receiving terminal RT. Various optical amplifiers V are provided in order to compensate for attenuation by the optical fibers.

In the receiving terminal RT, the wavelength division multiplex signal is broken down in a demultiplexer D into individual received signals E1–En, which are supplied to a respective optical receiver RX1–RXn.

The wavelength division multiplex signal is split at the reception end by a coupler K, which is connected upstream of the demultiplexer, and is supplied to an optical spectrum analyzer OSA. The level and OSNR values measured by the optical spectrum analyzer OSA are passed, via a separate control channel OSC (Optical Supervisory Channel) for example, to a preemphasis controller MD in the transmission terminal. The preemphasis controller MD comprises a computation device CU and an adjustment device SD which adjusts the transmitted levels of the individual transmitted signals, for example by controlling the output power level of the optical transmitters or, in this case, by adjusting the attenuators. The computation unit can likewise be provided at the reception end.

Figure 2A:
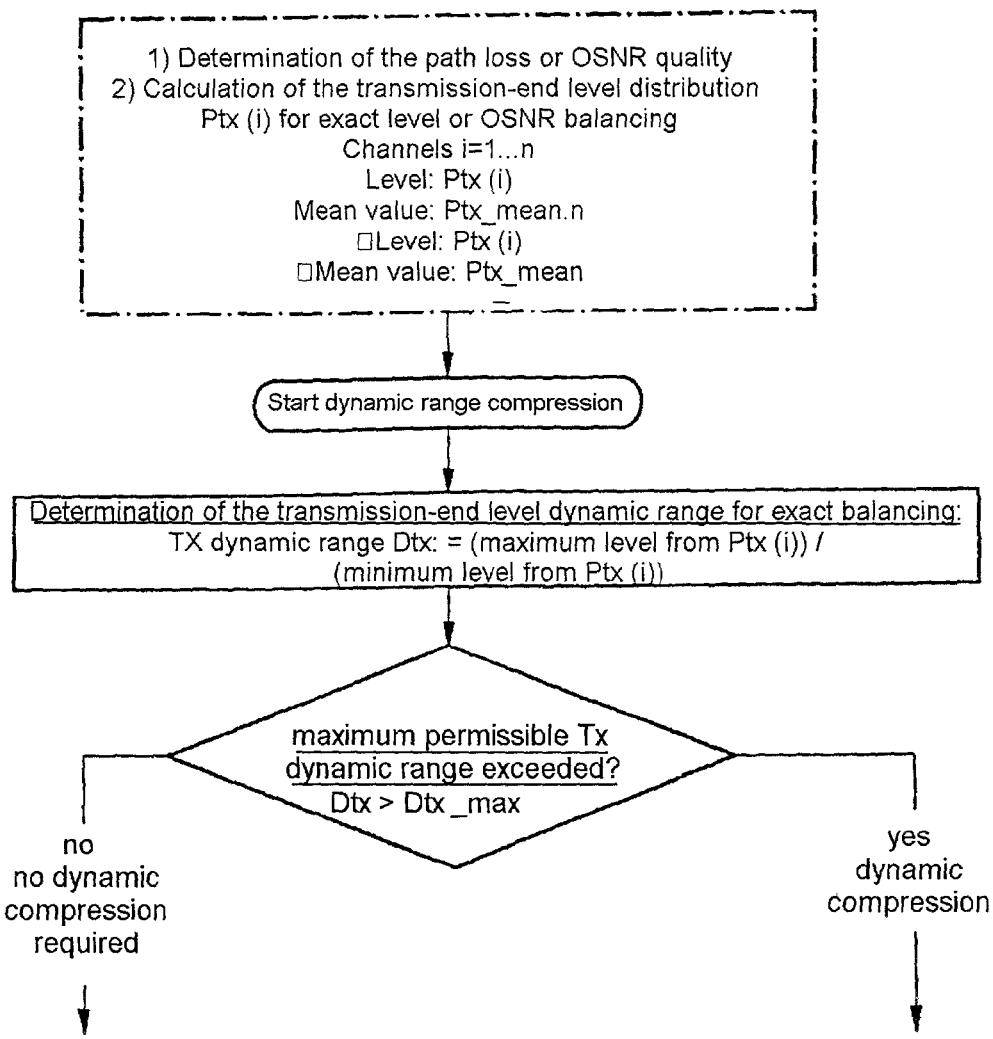
FIG. 2 shows a flowchart for transmission-end dynamic range compression.

Consider the situation in which only the transmission-end dynamic range is adjusted, on the basis of the flowchart shown in FIG. 2. Individual transmitted power levels and received power levels, or transmitted power levels and reception-end signal-to-noise ratios, for short distances, the attenuations in the individual channels or the OSNR quality (signal to noise ratio/transmitted power level) generally need to be measured.

Firstly, the transmission-end power distribution also called the level distribution, is then calculated for exact level or OSNR balancing at the reception end, based on the transmission characteristics of the individual channels, as described above.

The dynamic range compression can then be started. A first step determines the magnitude of the transmission-end level dynamic range Dtx. This corresponds to the quotient of the maximum level Ptx_max and the minimum level Ptx_min of the transmitted signals, with the term level in this case meaning the power on a linear scale, for example in milliwatts.

$$Dtx = \text{maximum level from } Ptx(i) \text{ minimum level from } Ptx(i) \quad \text{F1)}$$

i=1, 2, . . . n–Transmitted signal

A check is then carried out to determine whether the dynamic range Dtx which has been found is greater than the maximum permissible dynamic range Dtx max. If this is not the case, no dynamic range compression is carried out. However, if this is the case, the next computation step calculates the discrepancy, that is to say the offset, of the individual signal power levels from the mean value Ptx_mean, which has been determined from the optimum or maximum permissible transmitted power level of the transmission-end wavelength division multiplex signal divided by the number of signals.

$$deltaP\_tx(i) := Ptx(i) - Ptx\_mean \quad \text{F2)}$$

The next computation step determines the absolute maximum and minimum offset, in other words the offset of the strongest and weakest transmitted signal.

$$deltaPtx\_max := \max(deltaP\_tx(i))$$

$$deltaPtx\_min := \min(deltaP\_tx(i)) \quad \text{F3)}$$

The transmission compression factor is then calculated $$compfact\_tx := Ptx\_mean*(Dtx\_max-1)/(deltaPtx\_max - Dtx\_max*deltaPtx\_min) \quad \text{F4)}$$

This is then used to calculate the compressed levels using the following formulae:

$$deltaP\_tx(i) := dektaP\_txs(i)*compfact\_tx$$

$$Ptx(i) :- Ptx\_mean + deltaP\_tx(i) \quad \text{F5)}$$

The dynamic range compression has thus already been calculated and the newly calculated compressed transmission levels Ptx(i) of the transmitted signals S1 to Sn can be set.

Figure 3A:
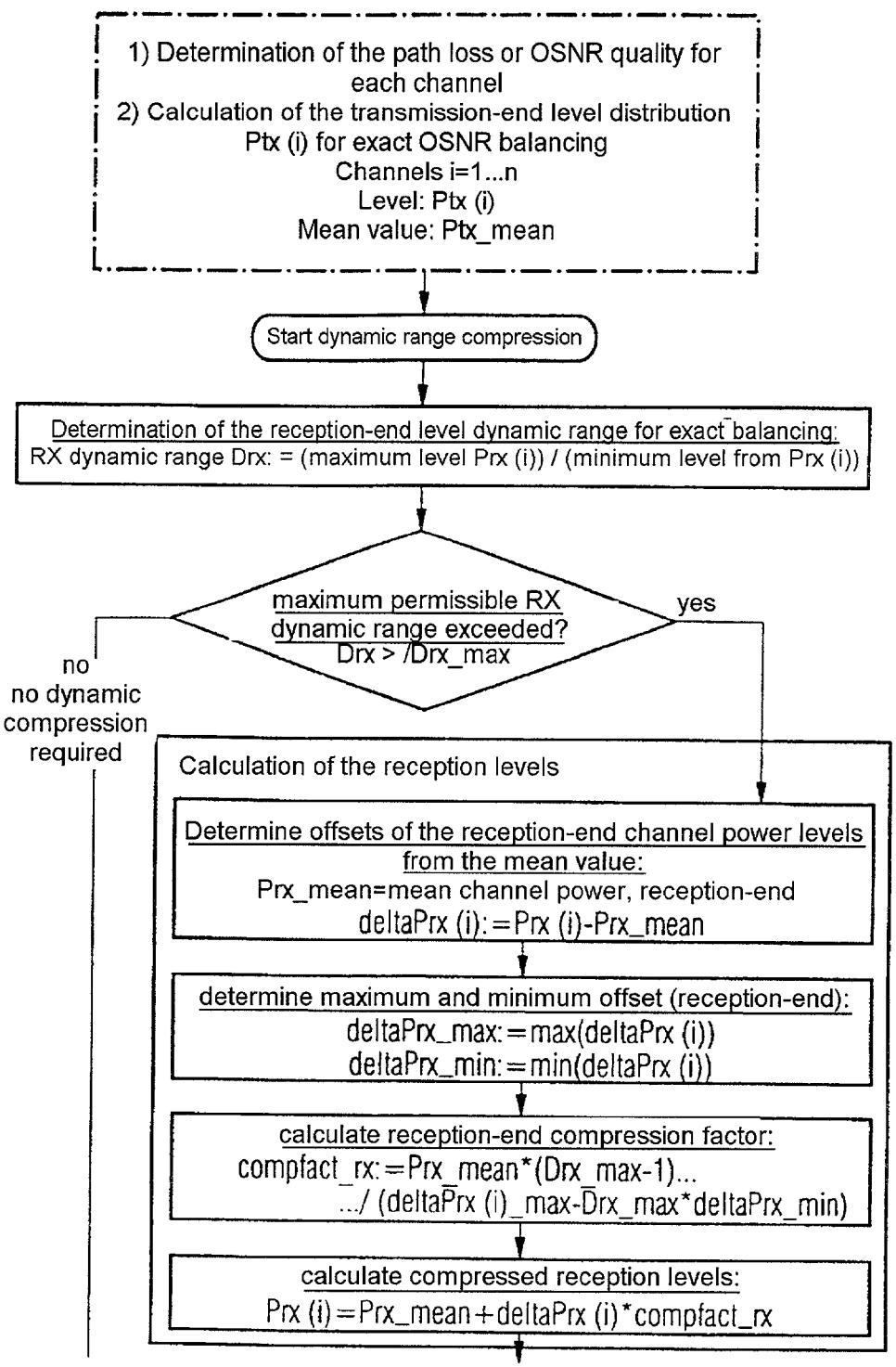
FIG. 3 shows a flowchart for reception-end dynamic range compression.
Figure 3B:
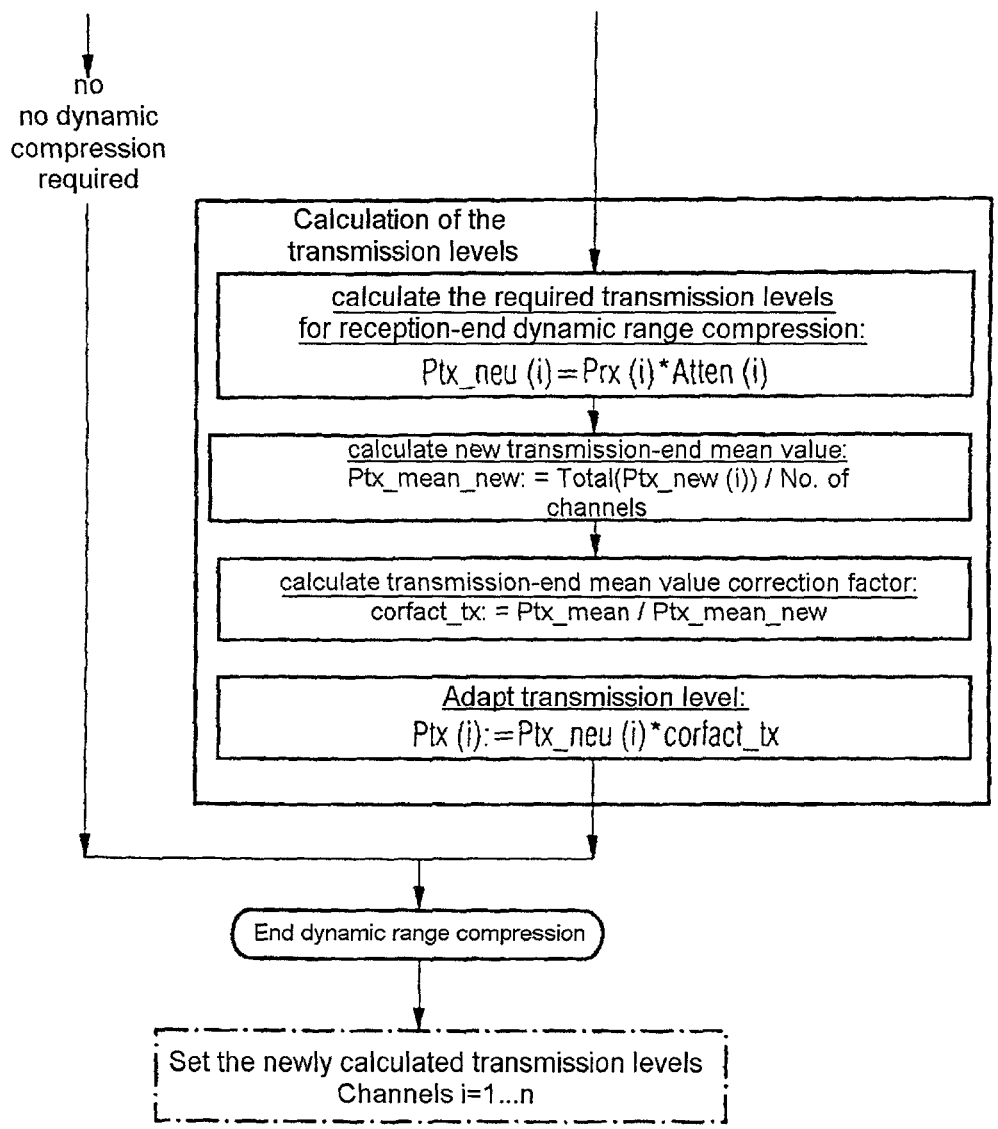

If the individual received signals E1 to En are intended to have the same signal-to-noise ratio, that is to say OSNR balancing is assumed, reception-end dynamic range compression can also be carried out, in an extended method as shown in FIG. 3. The compression method is once again dependent on the transmission characteristics of each channel being known.

This makes it possible to calculate the transmission-end levels for the individual transmitted signals, the level distribution, for OSNR balancing.

The reception-end dynamic range compression starts by determining the reception-end dynamic range Drx.

$$Drx := \text{maximum level from } Prx(i) \text{ minimum level from } Prx(i) \quad \text{F7)}$$

i=1, 2, . . . , n–Received signal

A check is then carried out to determine whether the maximum permissible reception-end dynamic range Drx is exceeded. If not, there is no need for reception-end dynamic range compression, and the calculated signal levels can be set at the transmission end. In general, a check of the maximum permissible transmission-end dynamic range is also required.

If the maximum permissible reception-end dynamic range Drx is exceeded, then, the discrepancies, or offsets, of the reception-end channel power levels Ptx(i) from the main value Ptx_mean are established:

$$deltaP\_rx(i) := P\_rx(i) - Prx\_mean \quad \text{F7)}$$

and the maximum and minimum offsets are determined:

$$deltaP\_rx\_max := -\max(deltaP\_rx(i)$$

$$deltaP\_rx\_min := \min(deltaP\_rx(i)) \quad \text{F8)}$$

The reception-end compression factor is then calculated:

$$compfact\_rx := Prx\_mean*(Drx\_max-1)/(deltaPrx\_max - Drx\_max*deltaPrx\_min) \quad \text{F9)}$$

The compressed reception levels are then determined:

$$Prx(i) := Prx\_mean*deltaP\_rx(i)*compfact\_rx \quad \text{F10)}$$

The already determined channel-specific path loss Atten(i) can now be used to determine the associated transmission levels from the compressed reception levels:

$$Ptx\_new(i) := Prx(i)*Atten(i) \quad \text{F11)}$$

It may be necessary to reduce the transmission signal power levels if the maximum permissible total power level is exceeded, or it is worthwhile increasing the transmitted signal power levels in order to improve the transmission characteristics. Both are carried out by new transmission-end level matching.

A new transmission-end mean value will be calculated for this purpose:

$$Ptx\_mean\_new = \text{Total}(Ptx\_new(i))/\text{Number of channels)} \quad \text{F12}$$

This is used to establish a transmission-end correction factor;

$$corfact\_tx = Ptx\_mean/Ptx\_mean\_new \quad \text{F13}$$

The new transmission levels are then calculated:

$$Ptx(i) = Ptx\_new(i) * corfact\_tx \quad \text{F14}$$

This completes the calculation of the dynamic range compression process, and the newly calculated transmission levels are set.

Of course signal failures must be taken into account in the dynamic range compression process, in which case time constants of the control loop are matched to the requirements.

Although modifications and changes may be suggest by those skilled in the art to which this invention pertains, it is the intention of the inventors to embody within the patent warranted hereon all changes and modifications that my reasonably and properly come under the scope of their contribution to the art.

What is claimed is:

1. A method for channel-specific adjustment of power levels of associated transmitted signals in an optical wavelength-division multiplex transmission system to achieve one of equal signal power levels and equal signal-to-noise ratios of received individual signals, the method comprising:
   determining transmission characteristics for each transmission channel;
   determining a transmission-end maximum permissible dynamic range;
   determining, on a channel-specific basis, signal power levels of the associated transmitted signals; and
   if the maximum permissible dynamic range at the transmission end is exceeded:
      determining individual power discrepancies of the transmitted signal power levels from a mean signal power level of the signals at the transmission end;
      calculating a transmission compression factor in compliance with the maximum permissible dynamic range, the mean signal power and maximum signal power discrepancies, the compression factor being equal for all transmitted signals;
      recalculating new signal power levels from the individual power discrepancies and the compression factor, such that a permissible reception-end maximum dynamic range is complied with; and
      setting newly calculated compression power levels of the transmitted signals;
      calculating a transmission-end correction factor from a ratio of a previous transmission-end mean level value to a transmission-end mean level value from a new transmitted signal power level; and
      changing the individual signal power levels of transmitted signals using the transmission-end correction factor, which is equal for all transmitted signals.

2. The method as claimed in claim 1, further comprising keeping a maximum permissible total power level of all the transmitted signals substantially constant.

3. The method as claimed in claim 2, further comprising determining transmitted signal power levels of the transmitted signals and transmission-end values derived therefrom by measuring signal power levels of received signals and from the transmission characteristics of the transmission channels.

4. A method for channel-specific adjustment of power levels of associated transmitted signals in an optical wavelength-division multiplex transmission system to achieve one of equal signal power levels and equal signal-to-noise ratios of received individual signals, the method comprising:
   determining transmission characteristics for each transmission channel;
   determining a reception-end maximum dynamic range;
   determining, on a channel-specific basis, power levels of the associated transmitted signals; and
   if the maximum permissible reception-end dynamic range is exceeded:
      determining individual power discrepancies of the transmitted signal power levels from a received mean signal power level;
      calculating a reception-end compression factor in compliance with the maximum permissible dynamic range, the mean signal power and maximum signal power discrepancies, the compression factor being equal for all received signals;
      calculating required compressed received signal power levels from the individual power discrepancies and the reception-end compression factor, such that the permissible reception-end maximum dynamic range is complied with;
      calculating required new transmitted signal power levels;
      setting the newly calculated transmission signal power levels;
      calculating a reception-end correction factor from a ratio of a previous reception-end mean level value to a reception-end mean level value from a new reception signal power level; and
      changing the individual signal power levels of received signals using the reception-end correction factor, which is equal for all transmitted signals.

5. The method as claimed in claim 4, further comprising keeping at least one of a total received signal power level of all received signals and a total transmitted signal power level of all transmitted signals substantially constant.

6. The method as claimed in claim 5, further comprising determining the transmitted signal power levels of the transmitted signals and transmission-end values derived therefrom by measurement of the received signal power levels of the received signals and from the transmission characteristics of the transmission channels.

7. The method as claimed in claim 6, further comprising
   keeping the maximum permissible total transmitted signal power level of all transmitted signals substantially constant.

* * * * *